United States Patent [19]

Akiba et al.

[11] Patent Number: 4,750,142

[45] Date of Patent: Jun. 7, 1988

[54] FLAME DETECTOR

[75] Inventors: Kouji Akiba; Akira Kitajima, both of Yokohama; Yoshio Arai, Sagamihara, all of Japan

[73] Assignee: Hochiki Corporation, Tokyo, Japan

[21] Appl. No.: 822,892

[22] Filed: Jan. 27, 1986

[30] Foreign Application Priority Data

Feb. 4, 1985 [JP] Japan .................................. 60-19648

[51] Int. Cl.[4] ........................ G01J 1/00; G08B 17/12; G08B 21/00

[52] U.S. Cl. .................................... 364/550; 250/340; 169/61; 340/578

[58] Field of Search ................ 364/550, 525; 356/315; 250/340, 342, 339, 554; 169/61; 340/577, 578, 511; 328/6

[56] References Cited

U.S. PATENT DOCUMENTS

| | | | |
|---|---|---|---|
| 4,206,454 | 6/1980 | Schapira | 340/578 |
| 4,220,857 | 9/1980 | Bright | 250/339 |
| 4,423,326 | 12/1983 | Ball | 340/578 |
| 4,553,031 | 11/1985 | Cholin et al. | 340/578 |

*Primary Examiner*—Parshotam S. Lall
*Assistant Examiner*—Daniel W. Juffernbruch
*Attorney, Agent, or Firm*—Lackenbach, Siegel, Marzullo & Aronson

[57] ABSTRACT

A flame detector comprising a flame sensor, a storing section for storing a predetermined reference value, a comparing section for comparing a value of a signal from the flame sensor which changes in amplitude corresponding to a change in flickering of flames with said reference value and adapted to detect flames when the value of said signal exceeds the reference value, and a flame determining section which comprises a computing section for computing a ratio of an amplitude value of a minus change component to an amplitude value of a plus change component of changes in flickering of flames. The storing section stores a preset first threshold value and a preset second threshold value higher than said first threshold value, and the flame determining section signifies the presence of flames is when the ratio of the amplitude values of the signals is larger than the first threshold value and lower than the second threshold value.

5 Claims, 7 Drawing Sheets

FLAME DETECTOR

FIELD OF THE INVENTION & RELATED ARTS

This invention relates to a flame detector adapted to detect flames on the basis of changes in the flickering characteristic of flames of a fire.

There have been heretofore proposed, based upon the knowledge that the flickering frequency characteristic of flames ranges from 0.5 to 20 Hz, flicker-type flame detectors which are adapted to detect flames based on changes of the flickering of the flames. Such flicker-type flame detector includes a flame sensor, e.g. a photoelectric transducer, which outputs signals corresponding to the magnitude of the light energy radiated from the flames and is adapted to separate frequency components characteristic of flames other signals from the flame sensor by means of a narrow-band filter, compare the amplitude values of the flame signals with a preset reference value and carry out required data processing when the flame signals exceed the reference value so as to detect the presence of the flames.

In the conventional flame detectors as described above, the reference value for discriminating flame signals from noises is set at a fixed value, and the signals are determined as noise when the flame signals are lower than the reference value and the signals are determined as flame signals when the signals exceed the reference value.

However, the conventional flame detector has the problem that it is liable to cause malfunction when a noise resulting from passing-by of a person before the flame sensor, or another noise having a shock-waveform such as a shot noise is temporarily generated, and if the level of the noise exceeds the reference value.

And even if the sizes of the flames are same, the magnitudes of energies radiated from the burning substances are sometimes different. For instance, if it is assumed that the flames in the burning of gasoline and the flames in the burning of sheets of newspaper are same in size, the flame in the burning of gasoline radiate more intense light energy and the flames in the burning of paper radiate weaker light energy.

For this reason, the conventional flame detector of the type as described above involves the problem that if the reference value is set high so as to adapt for the flames in the burning of gasoline, signals from the flames in the burning of paper can not sufficiently be perceived, resulting in delay in flame detection or failure in flame detection. On the other hand, if the reference value is set low so as to adapt for the flames in the burning of paper, the flames in the burning of gasoline will also be detected rapidly, but erroneous operations can possibly be caused by disturbance light, because setting the reference value low has the same effect as setting the detection sensitivity high. Thus, the flame detection operation becomes unstable.

OBJECTS AND SUMMARY OF THE INVENTION

It is an object of the present invention to provide a flame detector of high reliability which is capable of surely detecting flames without causing malfunction even if a temporary noise exceeding a preset reference value is received.

It is an another object of the present invention to provide a flame detector which is capable of surely and stably detecting flames, irrespective of the kinds of the burning substances or the intensity of energy radiated from the flames.

To achieve these objects, the present invention comprises a flame sensor, a storing section for storing a predetermined reference value, a comparing section for comparing a value of a signal from the flame sensor which changes in amplitude corresponding to a change in flickering of flames with said reference value and adapted to detect flames when the value of said signal exceeds the reference value and a determining section which comprises a computing section for computing a ratio of an amplitude value of a minus change component to an amplitude value of a plus change component of changes in flickering of flames and said storing section stores a preset first threshold value and a preset second threshold value higher than said first threshold value, and flame determination is made when the ratio of the amplitude values of the signals is larger than the first threshold value and lower than the second threshold value.

DESCRIPTION OF PREFERRED EMBODIMENTS OF THE INVENTION

Figure 1:
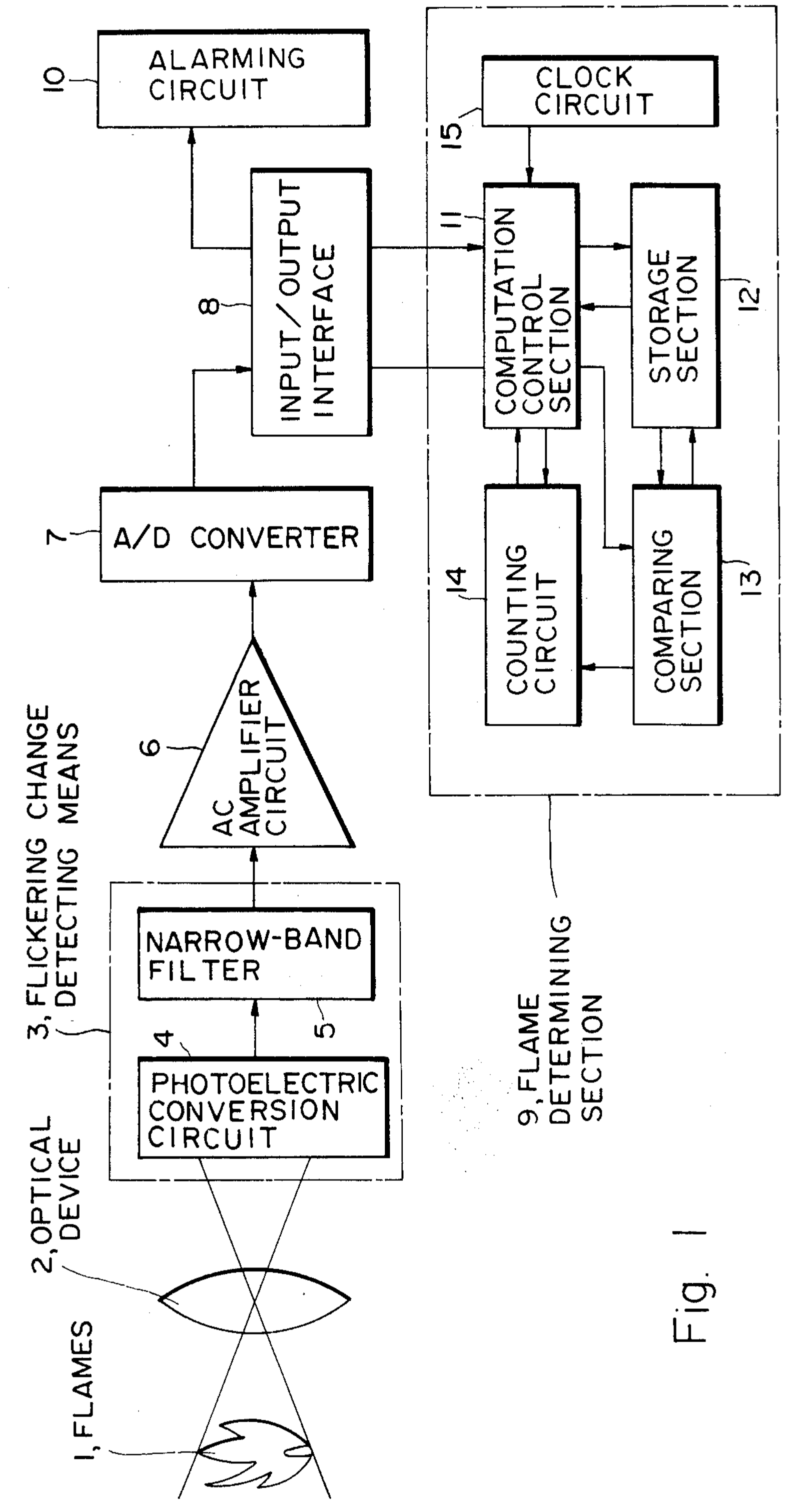
FIG. 1 is a block diagram of an entire system of a first form of a flame detector embodying the present invention.

Some preferred embodiments of the invention will now be described referring to the drawings.

First, an embodiment as illustrated in FIGS. 1 to 4 will be described. In the figures, 1 is flames, 2 an optical device and 3 a flickering change detecting means for detecting changes in flickering of the flames. The light energy from the flames 1 is received by the flickering change detecting means 3 through the optical device 2. The flickering change detecting means 3 comprises a photo-electric conversion circuit 4 including a photodiode, phototransistor or the like for converting a light signal to an electric signal, and a narrow-band filter 5 for separating high-frequency components in the frequency range characteristic of the flames, such as 0.5 to 20 Hz, and outputs a detection signal to an AC amplifier circuit 6. The AC amplifier circuit 6 amplifies the detection signal from the flames having a flickering frequency ranging from 1 to 10 Hz and outputs the signal to an A/D converter circuit 7. The A/D converter circuit 7 effects A/D conversion of the signal from the AC amplifier circuit 6 and outputs the signal to a flame determining section 9 through an input/output interface 8.

The flame determining section 9 includes a microcomputer and it outputs a signal to an alarming circuit 10 through the intput/output interface 8 to order alarm indication when it decodes the detection signal from the flickering change detecting means 3 and determines it as flames.

The inner formation of the determining section 9 will now be described. 11 is a computation control section which outputs the detection signal obtained from the flickering change detecting means 3 through the input/output interface 8 to a storage section 12 and a comparing section 13. The computation control section 11 computes a maximum amplitude A and an output ratio B as will be described in detail later. The storage section 12 sets, as a stored value, a level of a fire signal first obtained from the computation control section 11 and thereafter it renews the stored value of the level of the detection signal by selecting among the detection signals successively obtained from the computation control section 11 which is in synchronism with a signal output from the comparing section 13.

Figure 3:
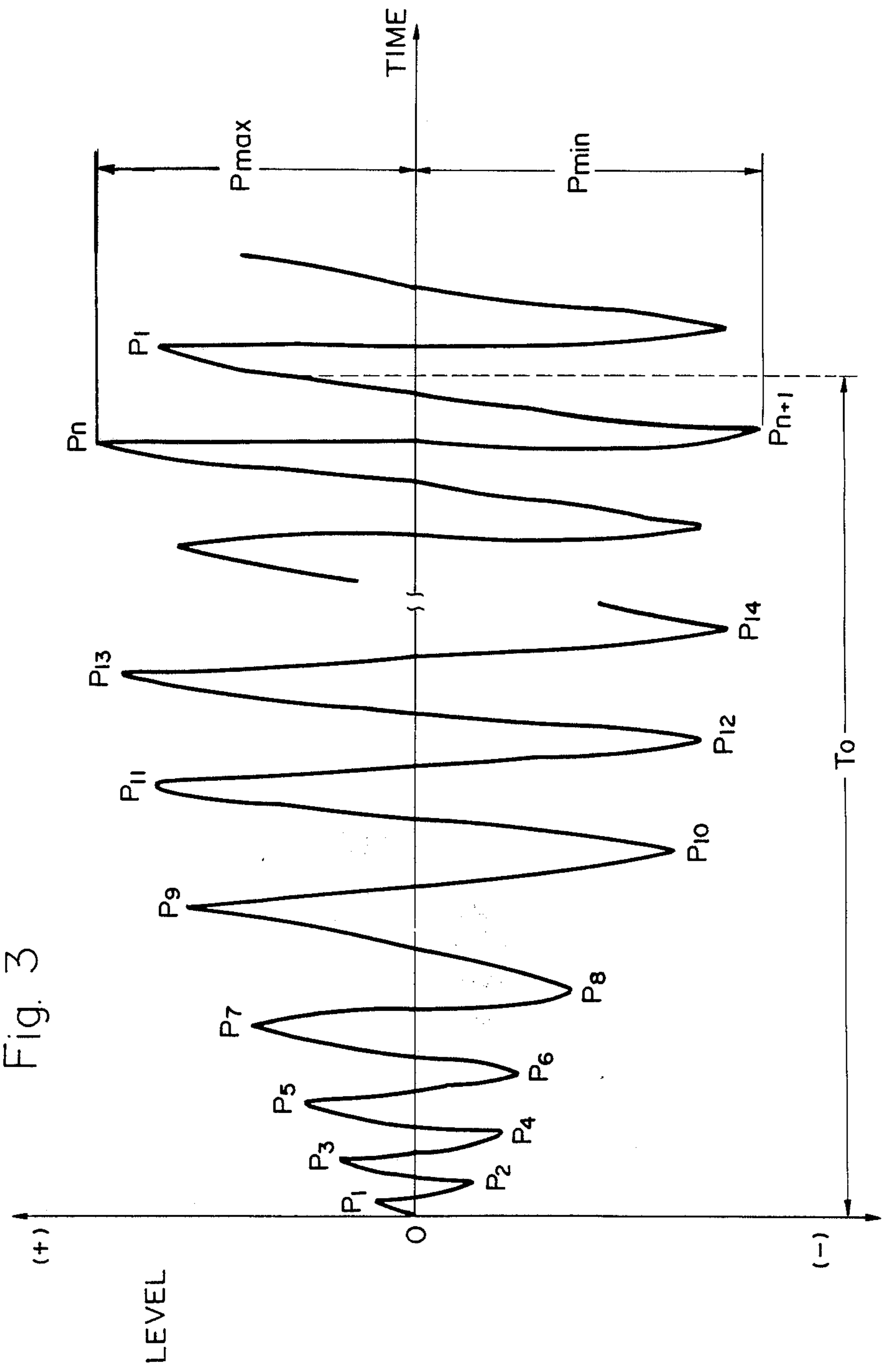
FIG. 3 is a graph showing changes of an output signal from a flickering change detecting means due to changes in the flickering of flames.

The setting of the value to be stored at the storage section 13 will be concretely described referring to FIG. 3. When the detection signal as illustrated in FIG. 3 is obtained, a detection signal P1 is set as a stored value Pmax of a plus change and a detection signal P2 is set as a stored value Pmin of a minus change. Thereafter, the stored values Pmax and Pmin are renewed based on the output signal from the comparing section 13 independently of each other. The comparing section 13 compares the level of the signal from the computation control section 11 with the stored value Pmax or Pmin set at the storage section 12.

Stated more specifically, signal level of the plus change component in the detection signal is compared with the stored value Pmax and the signal level of the minus change component in the detection signal is compared with the stored value Pmin. In either of the cases, when the amplitude of the detection signal exceeds the stored value Pmax or Pmin, a signal for renewing the set value is output to the storage section 12 and at the same time a comparison signal is output to a counter section 14. A predetermined count value is set in the counter section 14. The counter section 14 counts the comparison signals obtained from the comparing section 13 and it outputs a signal to the computation control section 11 when the count number reaches the predetermined count value. 15 is a clock circuit which continuously transmits time data to the computation control section 11. The computation control section 11 supervises a time elapsed since a first detection signal has been input from the flickering change detecting means 3 through the input/output interface 8 and it initiates a series of computation operations if the signal from the counter section 14 is obtained within the predetermined time To.

The computation processing will now be described more concretely. The latest stored values Pmax and Pmin set at the storage section 12 are taken out and the respective absolute values are added to obtain the maximum amplitude A. More specifically, the computation as given by formula (1) is carried out.

$$A = |Pmax| + |Pmin| \qquad (1)$$

If the value of the maximum amplitude A is a predetermined threshold level C1 or more, the ratio of the absolute value of the stored value Pmax to the absolute value of the stored value Pmin is computed to obtain the output ratio B. More specifically, the computation of formula (2) is carried out.

$$B = |Pmin| / |Pmax| \qquad (2)$$

The computation control section 11 has a first threshold value C2 and a second threshold value C3 higher than the first threshold value C2 set therein, and it makes the determination of flames when the value of the output ratio B is within a specific range of $C2 < B < C3$ including 1, for example, $0.5 < B < 2$. When the computation control section 11 makes a determination of flames based on the computation result, a signal for giving an alarm is output to the alarming circuit 10 through the input/output interface 8. This is based on the knowledge that in the case of flames, the changes in the flickering assume substantially the same values on the plus side and the minus side, respectively, as shwon in FIG. 3.

The computation control section 11 makes a determination of a noise and resets the counting operation of the counter section 14 when no signal is received from the counter section 14 within a predetermined time. Alternatively, the determination of flames may be made by the computation control section 11 when a signal is output from the counter section 14 so as to output a signal to the alarming circuit 10 through the input/output interface 8.

In this system, when the count number reaches the predetermined value within the predetermined period of time To, it is determined that the values of the detection signal increases or declines and that the flames are gaining power.

Figure 4A:
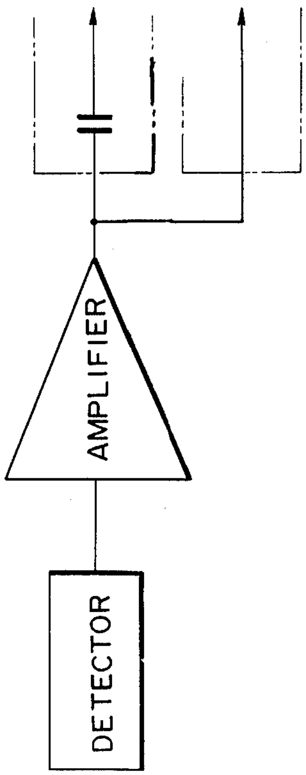
FIG. 4A is a block diagram showing details of an AC amplifier circuit in FIG. 1 and FIGS. 4B and 4C are graphs of output waveforms at points D1 and D2 of FIG. 4A, respectively.

FIG. 4A illustrates simply the function of the AC amplifier circuit 6. The output voltage waveform at an output terminal D1 of the amplifier *6a* is a waveform of a DC component of the signal superposed by an AC component as illustrated in FIG. 4B, while the output voltage waveform at an output terminal D2 of a capacitor *6b* is a waveform of an AC component alone as illustrated in FIG. 4C.

Figure 4B:
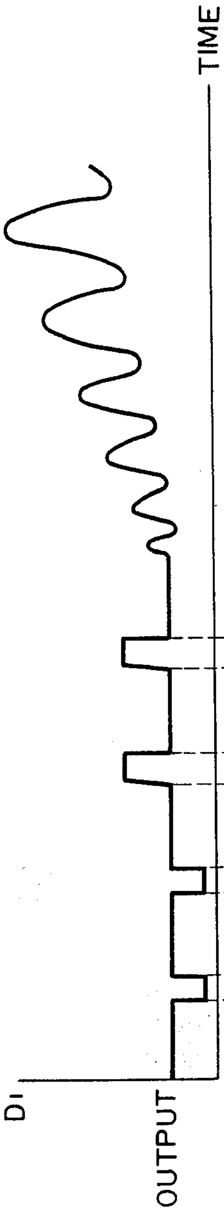
Figure 4C:
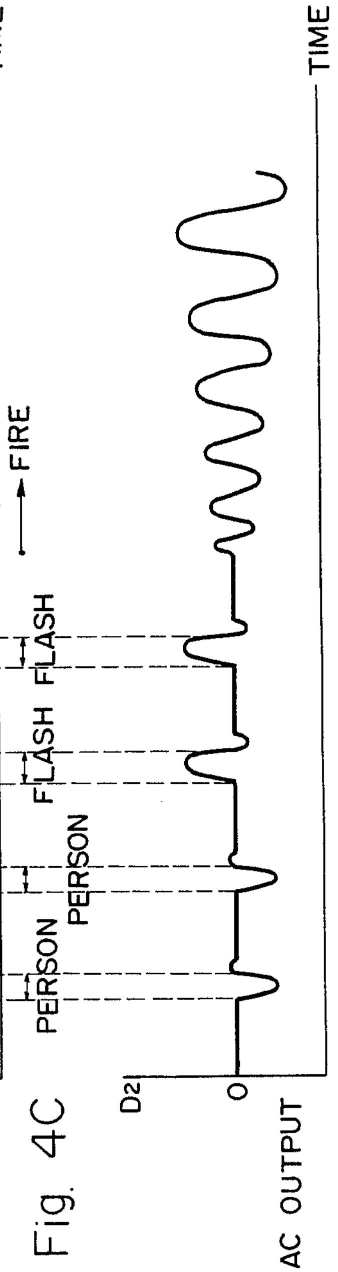
Figure 5:
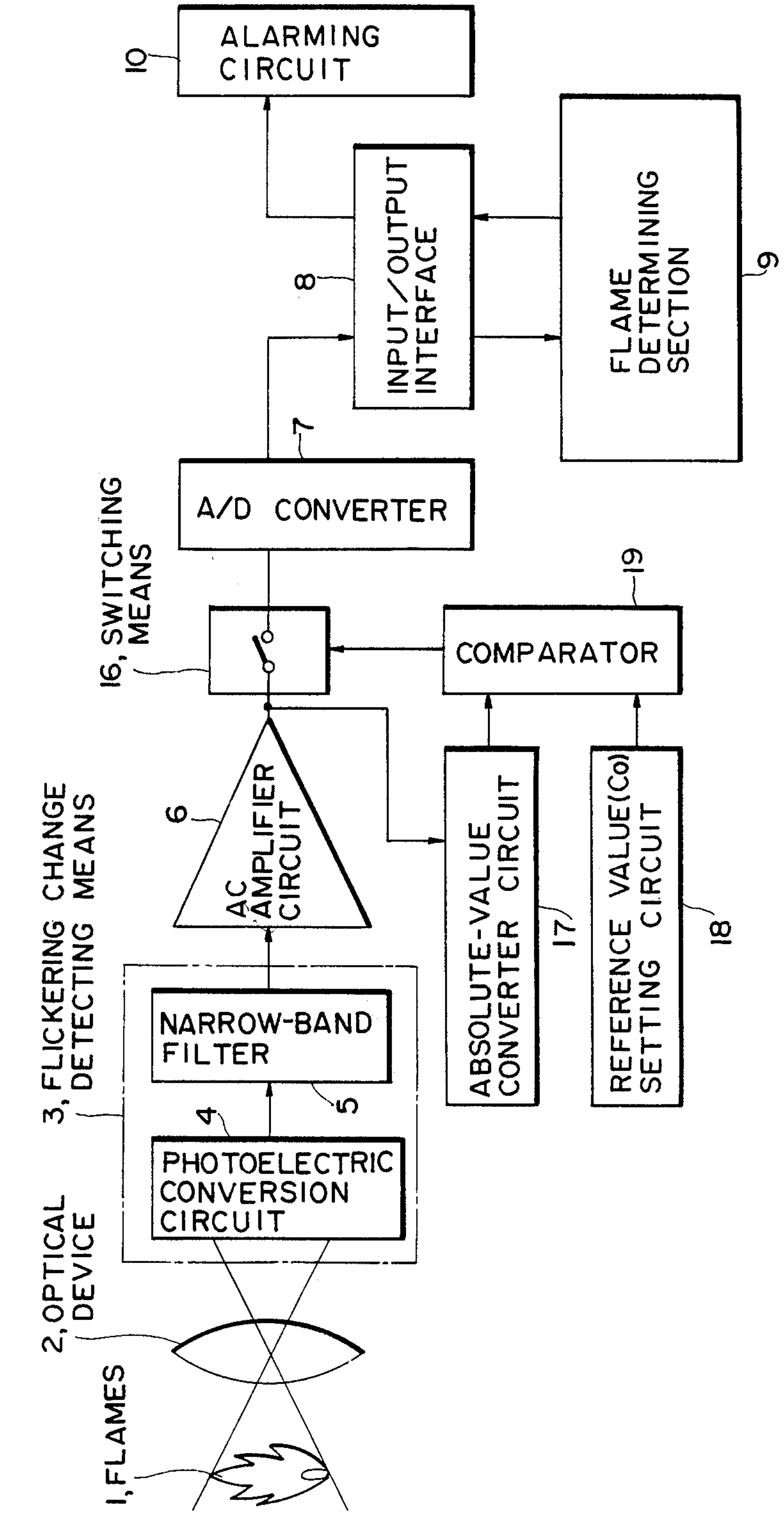
FIG. 5 is a block diagram of an entire system of a second form of a flame detector embodying the present invention.

In each of FIGS. 4B and 4C, a left portion thereof shows changes in the detection output when the flames 1 are intercepted by a person who is passing by the optical device 2. More specifically, when a person is passing by, the output signal appears as an output in a decreasing direction. The output signal after the person has passed by is easily restored at D1, while the output at D2 is not restored without some overshoot as shown in FIG. 4C. The middle portion of the graph of each of FIGS. 4B and 4C shows changes in the detection output when a noise light such as flashlight is incident upon the optical device 2. The output signal appears as an output in a transiently increasing direction. When the noise light disappears, the output signal easily restores its original level at D1 as in the case of the interception by a person, but the output restores its level at D2 only after some overshoot. The right portion of the graph of each of FIGS. 4B and 4c shows changes in the signal output caused by increased flames of a fire. This portion is enlargedly shown in FIG. 3.

In the conventional detector, fire determination is made whenever the maximum amplitude A is larger than the predetermined value, irrespective of the kind of a noise. In contrast, according to the present invention, a noise will appear as a very large ratio of Pmin to Pmax (when a person intercepts) or a very small ratio of Pmin to Pmax (when flashlight is incident) as apparent from FIGS. 4B and 4C. By this reason, the noise is not mis-determined as flames.

The operation of the present embodiment will be described referring to FIGS. 2 and 3.

Figure 2:
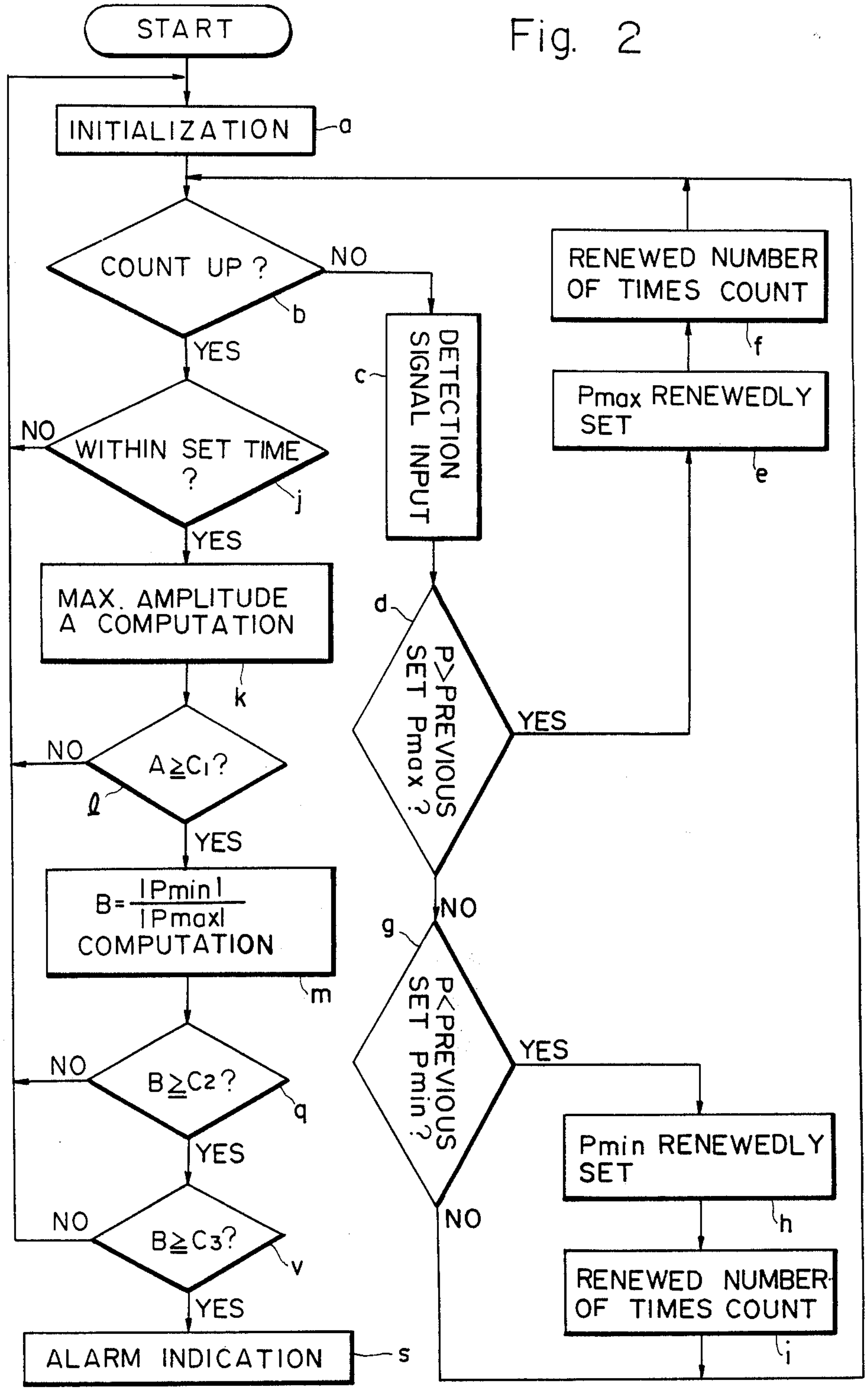
FIG. 2 is a flowchart of the operation of the same.

In FIG. 2, at block a, the count number at the counter section is set at a predetermined number and the contents of the memory is cancelled to effect initialization. When the flickering change detecting means 3 detects a light energy from the flames 1 and the detection signal P1 as shown in FIG. 3 is input thereto, the step proceeds to block d through block c since the counter section 14 does not count up at block b. At the comparing section 13, the signal level of the detection signal p1 obtained from the computation control section 11 with the stored value Pmax stored in the storage section 12. Since the stored value Pmax is set as zero in the storage section 12, the step proceeds from block d to block 3 where the signal level of the detection signal P1 is set as the stored value Pmax in the storage section 12. At block f, the counter section 14 counts the comparison outputs from the comparing section 13. The step returns from block f to block b. When the detection signal P2 as shown in FIG. 3 is input, the step proceeds to block d through block c since the counter section 14 does not count up the predetermined number. At block d, the comparing section 13 compares the signal level of the detection signal P2 obtained from the computation control section 11 with the stored value Pmax (=P1) set in the storage section. Since the signal level of the detection signal P2 is smaller than the stored value P1, the step proceeds to block g. At block g, the comparing section 13 compares the signal level of the detection signal P2 with the stored value Pmin set in the storage section 12. Since the stored value Pmin is set as zero at the storage section 12, the step proceeds from block g to block h to set the signal level of the detection signal P2 as a stored value Pmin. At block i, the counter section 14 counts +1 upon every comparison output from the comparing section 13 and the step again returns to block b. When the detection signal P3 is then input, the step proceeds to block d through block c since the counter circuit 14 does not count up. At block d, the comparing section 13 compares the signal level of the detection signal P3 with the value of P2 previously set as the stored value Pmax in the storage section 12. Since the signal level of the detection signal P3 is larger than the stored value P1, the step proceeds to block 3. At block 3, the signal level of the detection signal P3 is renewedly set as the stored value Pmax in the storage section 12. The step further proceeds to block f where the counter section 14 counts the comparison output from the comparing section 13.

Similarly, every time the detection signals P4, P5, P6 the storage section 12 is compared with the signal levels of the detection signals, and if the signal level of the detection signal is larger than the stored value Pmax or smaller than the stored value Pmin, the stored value of the storage section 12 is renewedly set and the counter section 14 counts +1.

In this connection, if the counter section 14 counts up the predetermined value at block b, the step proceeds from block b to block j. At block j. the computation control section 11 supervises the time lapsed since the first detection signal P1 was input and determines whether the count output from the counter section 14 is within the set period of time, namely To or not. At block j, when the set time To has been elapsed, the determination is made as a noise and the step returns again to block a from block j for again supervising flames.

As illustrated in FIG. 3, a count output is obtained from the counter section 14 within the time To, the step proceeds from block j to block k to compute the maximum amplitude A. More specifically, the computation control section 11 takes out the stored values Pmax and Pmin stored in the storage section 12 and adds the respective absolute values. At block 1, the determination is made as to whether the maximum amplitude A is larger than the predetermined threshold level C1 or not. When the maximum amplitude A is lower than the the threshold value C1, the determination is made as a noise and the step returns again to block a for further supervising of flames. At block 1, when the maximum amplitude A is larger than the threshold level C1, the step proceeds to block m to compute the output ratio B. More specifically, the computation control section 11 computes the ratio of the absolute value of the latest stored value Pmin to the absolute value of the latest stored value Pmax. The step proceeds to block q and block r. At block q and block r, the threshold value C2=0.5 smaller than 1 and the threshold value C3=2 larger than 1 are set. The value of the output ratio B is substantially 1 in accordance with the result of some experiment done by inventors. And an allowance is considered to set the value as mentioned above from 0.5 to 2. Thus the determination is made as to whether the output ration B is larger than the threshold value C2 and lower the the threshold value C3 or not. When the output ration B is lower than the threshold value C2, or the output ratio B is larger than the threshold value C3, the determination is made as a noise and the step returns again to block a to further supervise flames. At block q and block r, when the output ratio B is larger than the threshold value C3 and lower than the threshold value C2, the determination is made as flames and the step proceeds to block sto drive the alarming circuit 10 for indicating an alarm.

A second embodiment will now be described. In this second embodiment, a signal is output to the determining section 9 only when the respective amplitude values of the plus and minus change components of the flickering changes from the flickering change detecting means 3 exceed a predetermined reference value Co. When they are lower than the reference value Co, signal output to the determining section 9 is inhibited so as to reduce the task of computation at the determining section 9.

More particularly, a switching means 16 is provided between the AC amplifier circuit 6 and the A/D converter circuit 7. An absolute-value converter circuit 17 for absolute-converting the amplitude value of the detection signal from the AC amplifier circuit 6 and a reference value setting circuit 18 for setting the predetermined reference value are further provided. The absolute value signal from the absolute-converter circuit 17 and the reference value Co from the reference value setting circuit 18 are compared at a comparator 19. When the signal level of the detection signal exceeds the reference value Co, the switching means 16 is closed on the basis of an output from the comparator 19.

The other formation and operation of this embodiment are substantially the same as those of the first embodiment.

A third embodiment will now be described. In this embodiment, a determining section is formed by circuits without using a microcomputer.

Figure 6:
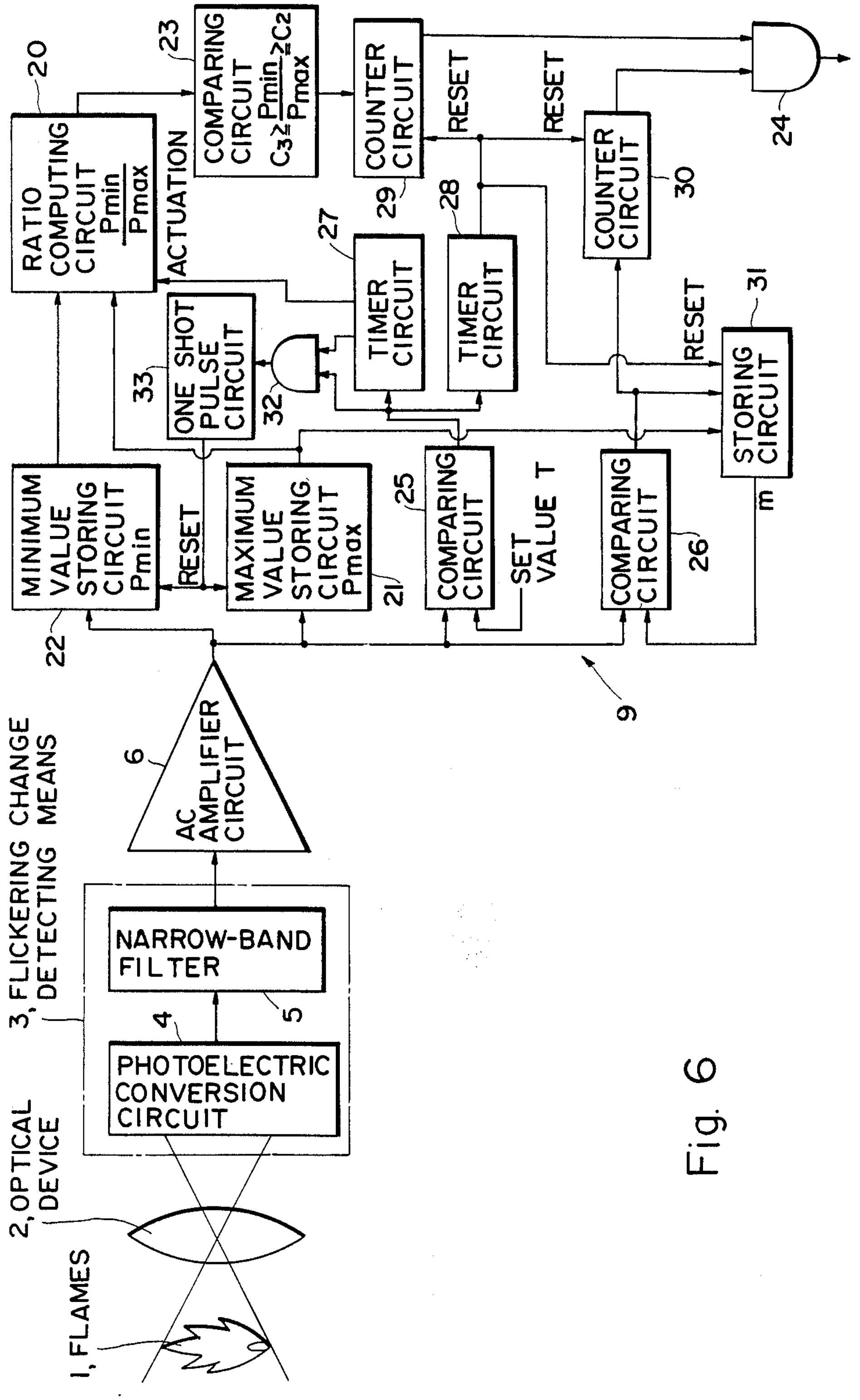
FIG. 6 is a block diagram of an entire system of a further form of a flame detector embodying the present invention.

In FIG. 6, 20 is a ratio computing circuit which takes out stored values Pmax and Pmin from a maximum value storing circuit 21 and a minimum value storing circuit 22 disposed between the AC amplifier circuit 6 and the ratio computing circuit 20 to compute the ratio B. After the ratio computing circuit 20 is connected a comparing circuit 23. This comparing circuit 23 is a window compartor and it compares the ratio B=|Pmin|/|Pmax| with a first threshold value C2 and a second threshold value C3 similar to those of the first embodiment and determines as to whether the ratio is between the two threshold values or not. When the ratio B is between the two threshold values C2 and C3, an output is generated to an AND circuit 24.

The output terminal of the AC amplifier circuit 6 is connected to two comparing circuits 25 and 26 in parallel with the maximum storing circuit 21 and the minimum storing circuit 22.

Figure 7:
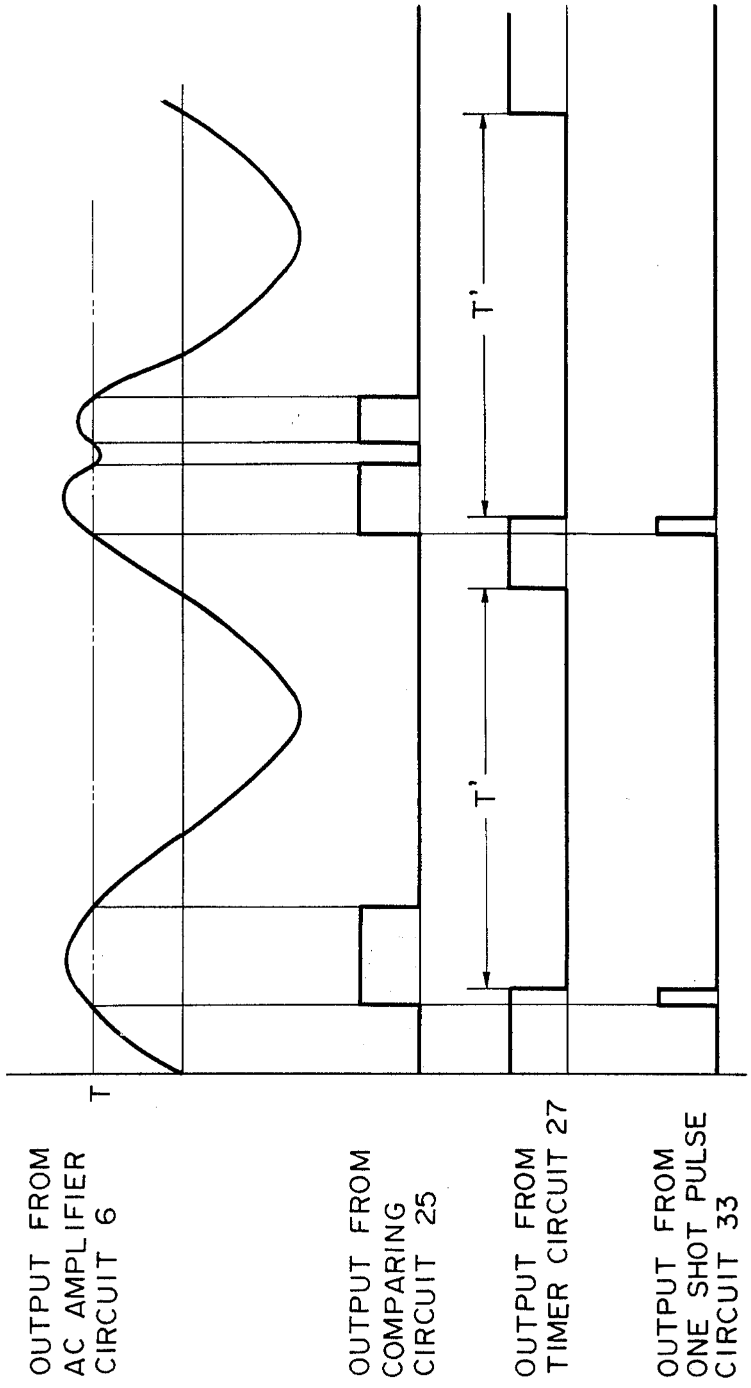
FIG. 7 is a graph showing an operation of the determining section shown in FIG. 6.

The comparing circuit 25 determines whether the determining section 9 is to be operated or not, based upon the comparison the signal level of a plus change component of the detection signal. More specifically, when the value of the detection signal exceeds a set value T, the comparing circuit 25 generates an output. This output actuates a timer circuit 27 and the timer circuit 27 transmits an actuation signal to the ratio computing circuit 20. The output from the comparing circuit 25 is also input to AND circuit 32. As shown in FIG. 7, the output of the timer circuit 27 is input to the AND circuit 32. The AND circuit 32 generates an output to a one shot pulse circuit 33. And the one shot pulse circuit 33 generates a reset signal, which is shown in FIG. 7 as narrow width one shot pulse, to the the maximum storing cricuit 21 and the minimum storing circuit 22. Further the output of the timer circuit 27 will turn to low level with a little delay of time as shown in FIG. 7, and it will return to high level after a predetermed time T'. The time T' is predetermined corresponding to one cycle of the change of the output from the AC amplifier circuit 6. Thus the time the output of the timer circuit 27 is in low level, the reset signal never output from the circuit 33. If the output signal from the AC amplifier circuit 6 vibrates as shown in latter half of FIG. 7 in the vicinity of the predetermined value T, the comparing circuit 25 generates continuous plural output. In this case, the output of the timer circuit 27 is in low level as shown, after the second and the successive output are output succeeding to the first output of the comparing circuit 25, thus the other reset signal will not be occurred.

By this reason, when the comparing circuit 25 generates an output, the stored contents of the storing circuits 21 and 22 are reset, and the largest values of the plus change component and the minus change component of the detection signal first input after resetting are stored as a maximum value Pmax and a minimum value Pmin and output to the ratio computing circuit 20 as described above. In this case, one cycle of signal changes is needed for the largest values of the plug change component and the minus change component of the detection signal to be stored. For this reason, the timer circuit 27 is set so that the ratio computing circuit 20 may be kept operating during the cycle.

Further the predetermined time T' and the expected cycle can be set independently with each other or be set in some relation with each other, e.g. as the same value.

The output of the comparing circuit 25 is also supplied to another timer circuit 28. In this circuit 28, a supervising time To for the detection signal is set, and the timer circuit 28 outputs a reset signal to counter circuits 29 and 30 and a storing circuit 31 as will be described in detail in later after the time To has been passed since the first output from the comparating circuit 25.

The comparing circuit 26 compares the maximum value m of the plus change component of the detection signal stored in the storing circuit 31 with the value of the detection signal and generates an output when the value of the detection signal exceeds the stored value m.

In the storing circuit 31, a first output from the maximum value storing circuit 21 is first stored and the stored contents are renewed every time the comparing circuit 26 generates and output. Thus, the storing cricuit 31 always stores the latest maximum value. In other words, the comparing circuit 26 functions also as a control circuit for the storing circuit 31.

The comparing circuit 26 generates an output to the counter circuit 30. The counter circuit 30 counts up +1 upon every output from the comparing circuit 26 and generates an output to the AND circuit 24 when the count value reaches the predetermined value. The AND circuit 24 generates a drive signal to the alarming circuit 10 and other control circuits when both the output from the comparing circuit 23 (window comparator) and the output from the comparing circuit 26 are obtained.

A counter circuit 29 connected between the comparing circuit 23 and the AND circuit 24 is provided for preventing mis-determination by noises. This counter circuit 29 counts up +1 upon every output from the comparing circuit 23. When the count value reaches the predetermined number, an output to the AND circuit 24 is for the first time generated.

The contents of the counter circuits 29 and 30 and the storing circuit 31 are cancelled by the reset signal from the timer circuit 27 as described above. More particularly, the contents of the counter circuits 29 and 30 and the storing circuit 31 are reset to zero when the set time To determining the supervising cycle has been passed. Therefore, if either of the counter circuits 29 and 30 generates an output within the time To, determination is such that there are no flames or there is only a single output due to noises. The storing circuit 31 is put into a standby state for receiving and storing a maximum value of the detection signal in a new supervisory cycle.

However the AND circuit 24 can be eliminated. In this case each output of the counter circuit 29 or 30 can be employed respectively as the output of the determining section 9.

Other formations are similar to those of the first embodiment and same or like parts and portions are denoted by the same or lime numerals in FIG. 6.

What is claimed is:

1. A flame detector comprising a flame sensor, a storing section for storing a predetermined reference value, and a comparing section for comparing a value of a signal from the flame sensor which changes in amplitude corresponding to a change in flickering of flames with said reference value, said comparing section being adapted to signify detection of flames when the value of said sensor signal exceeds the referenced value, said flame detector further comprises:

a flame determining section comprising a computing section for computing the ratio of the amplitude of a minus change component to the amplitude of a plus change component of said sensor signal due to changes in flickering of flames, said storing section storing a preset first threshold value and a preset second threshold value higher than said first threshold value; said flame determining section signifying the presence of flames when said ratio of the amplitude values of the sensor signal components is larger than the first threshold value and lower than the second threshold value.

2. A flame detector as claimed in claim 1, wherein said flame determining section comprises a control section for renewedly setting, as reference values, the maximum value and/or the minimum value of said signal into the storing section based on the output from the comparing section and a counter section which counts the output from the comparing section and outputs a signal signifying the presence of flames when the count number reaches a predetermined value.

3. A flame detector as claimed in claim 1, wherein in said determining section the preset first threshold value is set as 0.5 and the preset second threshold value is set as 2, and the flame determining section signifies the presence of flames when the ratio of the amplitude values of the sensor signal components is between these two threshold values.

4. A flame detector as claimed in claim 1, further comprising switching means which turns on to supply the flames sensor signal to the flame determining section when changes in amplitude of said signal due to changes in the flickering of flames exceeds a predetermined value.

5. A flame detector as claimed in claim 1, wherein the flame determining section further includes a comparing means which determines when changes in amplitude of the flame sensor signal due to changes in the flickering of flames exceeds a predetermined value.

* * * * *